United States Patent
Sheffield et al.

(10) Patent No.: US 10,192,115 B1
(45) Date of Patent: Jan. 29, 2019

(54) VIRTUALIZING OBJECTS USING OBJECT MODELS AND OBJECT POSITION DATA

(71) Applicant: Lowe's Companies, Inc., Mooresville, NC (US)

(72) Inventors: Mason E. Sheffield, Woodinville, WA (US); Josh Shabtai, Cornelius, NC (US)

(73) Assignee: Lowe's Companies, Inc., Mooresville, NC (US)

(*) Notice: Subject to any disclaimer, the term of this patent is extended or adjusted under 35 U.S.C. 154(b) by 9 days.

(21) Appl. No.: 15/840,567

(22) Filed: Dec. 13, 2017

(51) Int. Cl.
| | |
|---|---|
| G06K 9/00 | (2006.01) |
| G06N 99/00 | (2010.01) |
| G06T 19/00 | (2011.01) |
| G06F 17/30 | (2006.01) |
| G06T 7/73 | (2017.01) |

(52) U.S. Cl.
CPC ..... *G06K 9/00671* (2013.01); *G06F 17/3087* (2013.01); *G06F 17/30259* (2013.01); *G06N 99/005* (2013.01); *G06T 7/75* (2017.01); *G06T 19/006* (2013.01); *G06T 2207/10016* (2013.01); *G06T 2207/10028* (2013.01)

(58) Field of Classification Search
CPC ..... G06K 9/00671; G06T 7/75; G06T 19/006; G06T 2207/10016; G06T 2207/10028; G06F 17/30259; G06F 17/3087; G06N 99/005
See application file for complete search history.

(56) References Cited

U.S. PATENT DOCUMENTS

| 7,391,424 B2 | 6/2008 | Lonsing |
| 7,627,502 B2 | 12/2009 | Cheng et al. |

(Continued)

FOREIGN PATENT DOCUMENTS

| WO | 2015192117 | 12/2015 |
| WO | 2016075081 | 5/2016 |
| WO | 2017100658 | 6/2017 |

OTHER PUBLICATIONS

3D Room Designer. [online] Living Spaces, Jul. 2017 [retrieved on Dec. 13, 2017]. Retrieved from the Internet: <URL: www.livingspaces.com>, 5 pages.

(Continued)

*Primary Examiner* — Vincent Rudolph
*Assistant Examiner* — Pinalben Patel
(74) *Attorney, Agent, or Firm* — Kilpatrick Townsend & Stockton LLP

(57) ABSTRACT

Described herein are a system and methods for generating a record of objects, as well as respective positions for those objects, with respect to a user. In some embodiments, a user may use a user device to scan an area that includes one or more objects. The one or more objects may be identified from image information obtained from the user device. Positional information for each of the one or more objects may be determined from depth information obtained from a depth sensor installed upon the user device. In some embodiments, the one or more objects may be mapped to object models stored in an object model database. The image information displayed on the user device may be augmented so that it depicts the object models associated with the one or more objects instead of the actual objects.

29 Claims, 11 Drawing Sheets

(56) References Cited

U.S. PATENT DOCUMENTS

| | | |
|---|---|---|
| 8,463,025 B2 | 6/2013 | Melvin et al. |
| 8,687,104 B2 | 4/2014 | Penov et al. |
| 8,797,354 B2 | 8/2014 | Noge |
| 8,866,847 B2 | 10/2014 | Bedi et al. |
| 9,001,154 B2 | 4/2015 | Meier et al. |
| 9,373,195 B2 | 6/2016 | Kasahara |
| 9,552,650 B2 | 1/2017 | Furuya |
| 9,563,825 B2 | 2/2017 | Shen et al. |
| 9,697,416 B2 | 7/2017 | Shen et al. |
| 9,728,010 B2 | 8/2017 | Thomas et al. |
| 2012/0062596 A1* | 3/2012 | Bedi ............... G06Q 30/0256 345/633 |
| 2014/0072213 A1 | 3/2014 | Paiton et al. |
| 2014/0171039 A1* | 6/2014 | Bjontegard ....... H04L 29/06034 455/414.1 |
| 2016/0048497 A1 | 2/2016 | Goswami |
| 2016/0086078 A1 | 3/2016 | Ji et al. |
| 2016/0174902 A1 | 6/2016 | Georgescu et al. |
| 2016/0180193 A1 | 6/2016 | Masters et al. |
| 2016/0189426 A1* | 6/2016 | Thomas ................ G06T 19/006 345/633 |
| 2016/0217615 A1* | 7/2016 | Kraver ................. G06T 19/006 |
| 2016/0275376 A1 | 9/2016 | Kant |
| 2016/0300293 A1 | 10/2016 | Nagar |
| 2016/0364793 A1 | 12/2016 | Sacco |
| 2017/0011558 A1 | 1/2017 | Meier et al. |
| 2017/0021273 A1* | 1/2017 | Rios ..................... A63F 13/332 |
| 2017/0039613 A1 | 2/2017 | Kaehler et al. |
| 2017/0039986 A1* | 2/2017 | Lanier .................... G06F 3/011 |
| 2017/0132497 A1 | 5/2017 | Santos et al. |
| 2017/0140236 A1 | 5/2017 | Price et al. |
| 2017/0154425 A1 | 6/2017 | Pierce et al. |
| 2017/0161592 A1 | 6/2017 | Su et al. |
| 2017/0178272 A1* | 6/2017 | Lashkari ................. G06T 1/20 |
| 2017/0200313 A1 | 7/2017 | Lee et al. |
| 2017/0229154 A1* | 8/2017 | Bose ...................... G11B 27/34 |

OTHER PUBLICATIONS

Cheng et al., Locality-Sensitive Deconvolution Networks with Gated Fusion for RGB-D Indoor Semantic Segmentation. Computer Vision Foundation [online], Jul. 2017 [retrieved on Dec. 13, 2017]. Retrieved from the Internet: <URL: http://openaccess.thecvf.com/content_cvpr_2017/papers/Cheng_Locality-Sensitive_Deconvolution_Networks_CVPR_2017_paper.pdf>, pp. 3029-3037.

Izadinia et al., IM2CAD, University of Washington [online], Apr. 2017 [retrieved on Dec. 13, 2017]. Retrieved from the Internet: <URL: https://homes.cs.washington.edu/~izadinia/files/im2cad_CVPR17.pdf> < <arXiv preprint arXiv:1608.05137>. >, 10 pages.

Kang et al., Discovering Object Instances From Scenes of Daily Living. IEEE International Conference on Computer Vision (ICCV) [online], Nov. 2011 [retrieved on Dec. 13, 2017], Retrieved from the Internet: <URL: http://ieeexplore.ieee.org/abstract/document/6126314/>, pp. 762-769.

Li et al., Rgb-d Scene Labeling With Long Short-term Memorized Fusion Model. [online] Apr. 2016 [retrieved on Dec. 13, 2017]. Retrieved from the Internet: <URL: https://pdfs.semnaticscholar.org/df4b/5974b22e7c46611daf1926c4d2a7400145ad.pdf> <arXiv preprint arXiv:1604.05000>.>, 17 pages.

Massa et al., Deep Exemplar 2d-3d Detection by Adapting From Real to Rendered View. Proceedings of the IEEE Conference on Computer Vision and Pattern Recognition (2016), pp. 6024-6033.

McCormac et al., Semanticfusion: Dense 3d Semantic Mapping With Convolutional Neural Networks. IEEE International Conference on Robotics and Automation (ICRA) (May-Jun. 2017), 7 pages.

Qi et al., Pointnet: Deep Learning on Point Sets for 3d Classification and Segmentation, [online], Apr. 2017 [retrieved on Dec. 13, 2017]. Retrieved from the Internet: <URL: https://arxiv.org/pdf/1612.00593.pdf > <arXiv preprint arXiv:1612.00593>.>, 19 pages.

Wu et al., Single Image 3d Interpreter Network. European Conference on Computer Vision. Springer International Publishing (Sep. 2016), pp. 365-382.

Xiang et al., Objectnet3d: A Large Scale Database for 3d Object Recognition. European Conference on Computer Vision. Springer International Publishing (Sep. 2016), pp. 160-176.

Yurieff, Kaya. This Shopping App Lets You See a Virtual Couch in Your Real Living Room. [online] CNN Tech, May 3, 2017 [retrieved on Dec. 13, 2017]. Retrieved from the Internet: <URL: http://money.cnn.com/2017/05/03/technology/houzz-3d-augmented-reality-shopping/index.html>, 3 pages.

Zahavy et al., Is a Picture Worth a Thousand Words? A Deep Multi-modal Fusion Architecture for Product Classification in E-commerce. [online] Nov. 2016 [retrieved on Dec. 13, 2017]. Retrieved from the Internet: <URL: https://arxiv.org/abs/1611.09534> < arXiv preprint arXiv:1611.09534>.>, 10 pages.

Zhao et al., Image Parsing With Stochastic Scene Grammar. [online] Advances in Neural Information Processing Systems 24, 2011 [retried on Dec. 13, 2017]. Retrieved from the Internet: <URL: http://papers.nips.cc/paper/4236-image-parsing-with-stochastic-scene-grammar.pdf>, 9 pages.

Zhao et al., Scene Parsing by Integrating Function, Geometry and Appearance Models. Proceedings of the IEEE Conference on Computer Vision and Pattern Recognition (Jun. 2013), 8 pages.

* cited by examiner

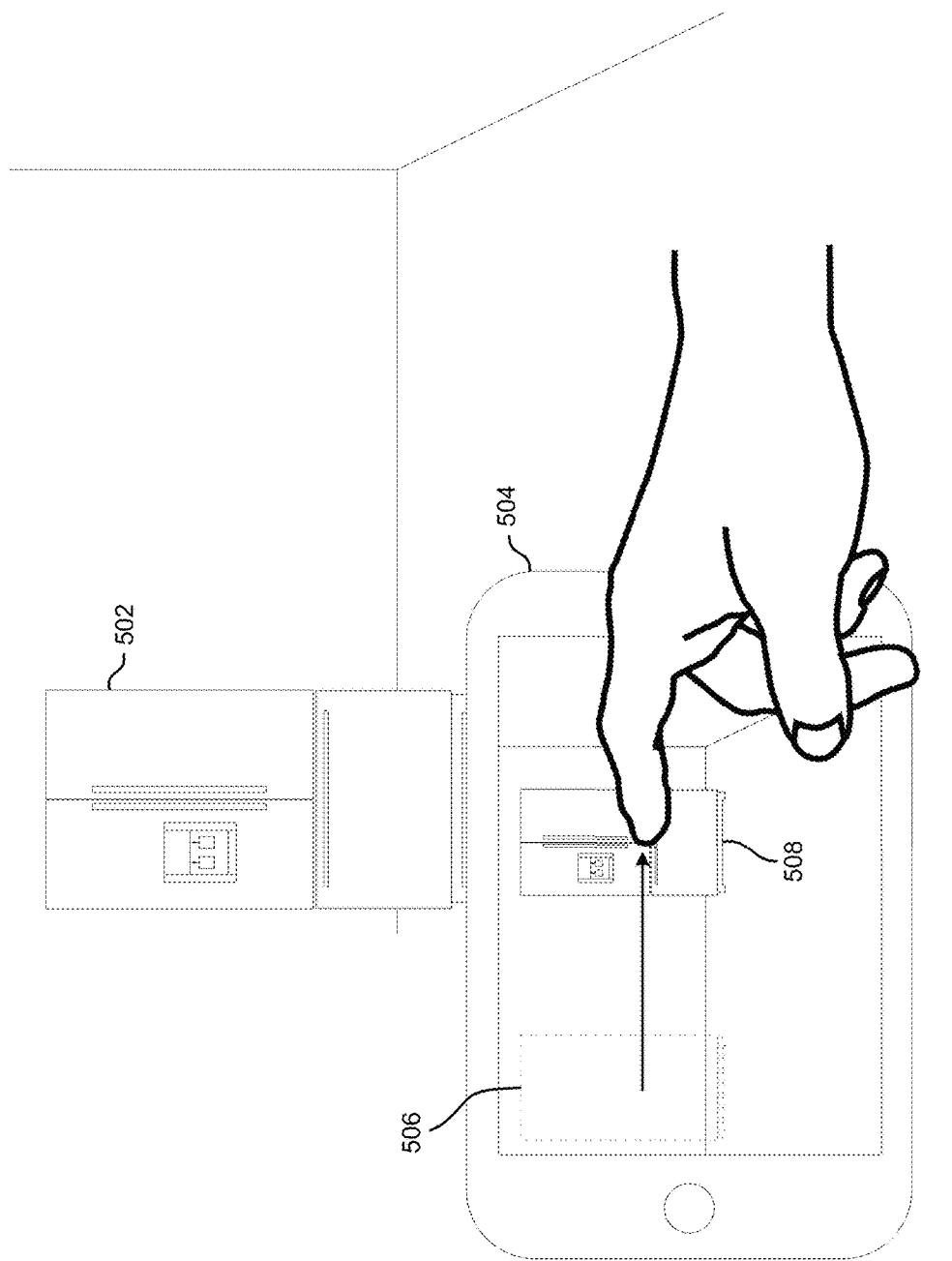

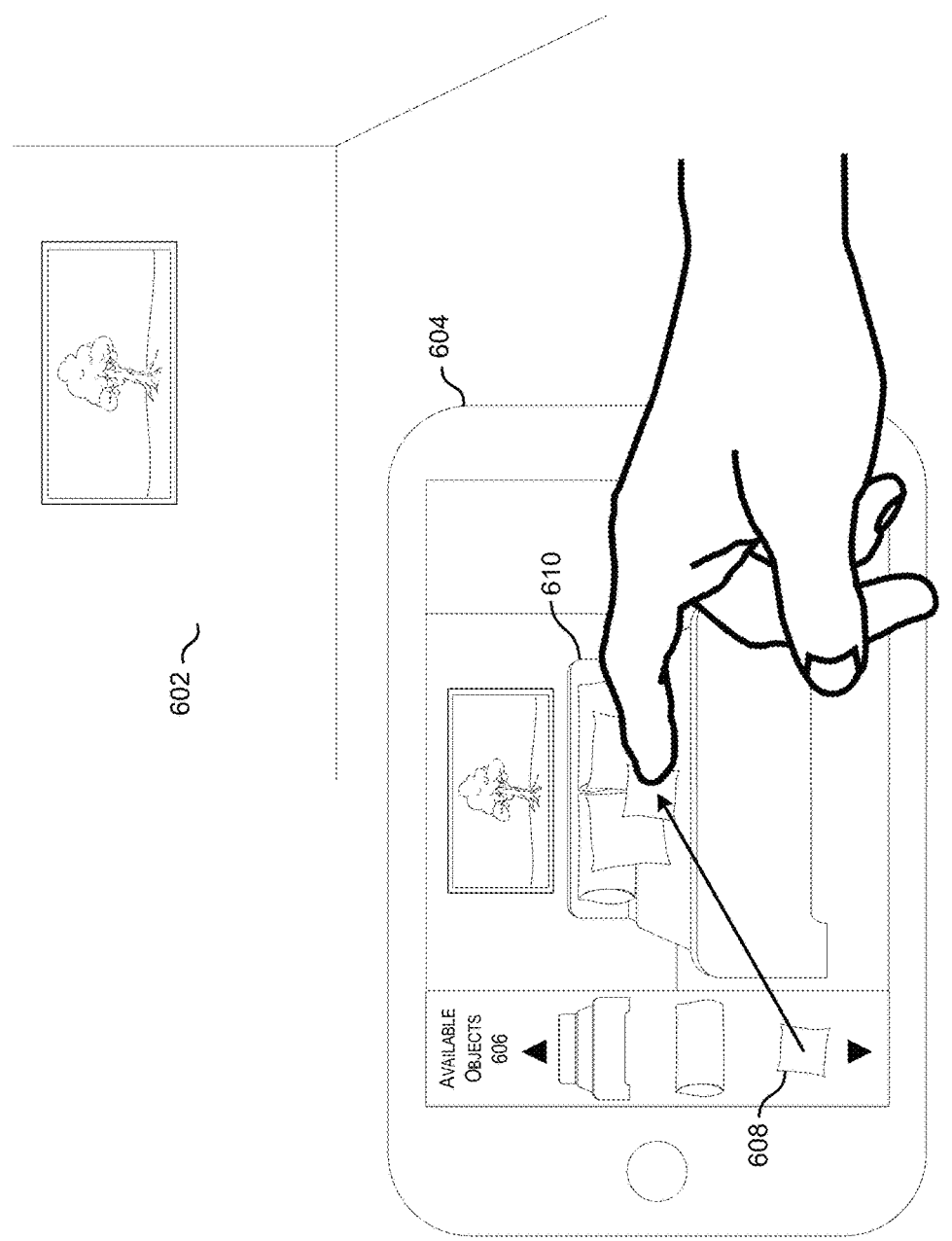

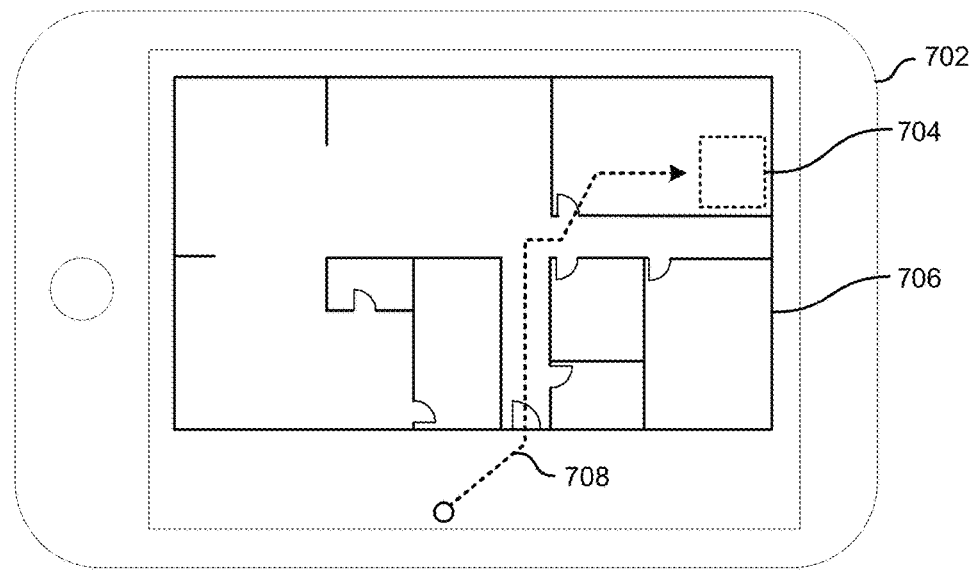
FIG. 7A
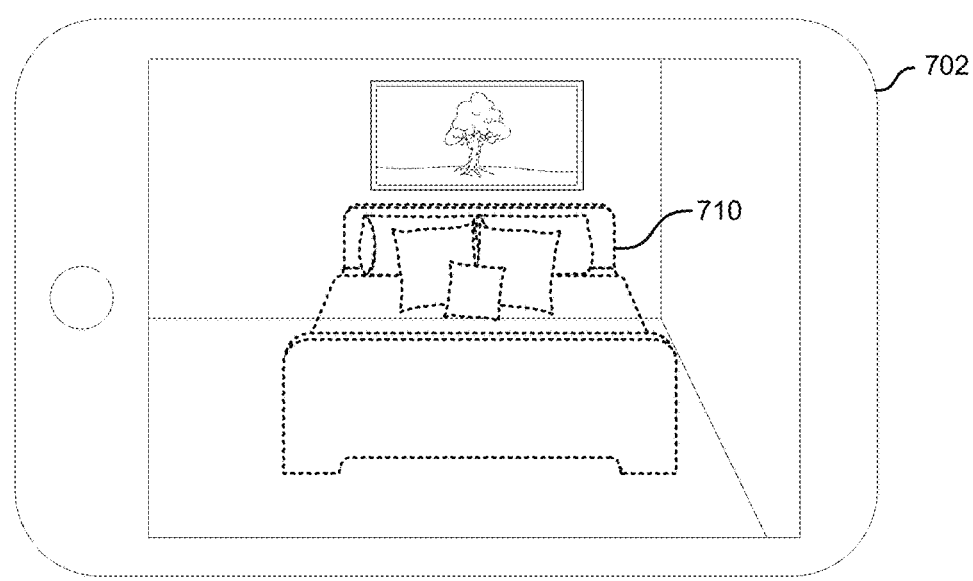
FIG. 7B
FIG. 7

VIRTUALIZING OBJECTS USING OBJECT MODELS AND OBJECT POSITION DATA

BACKGROUND

Augmented reality (AR) is a field of computer applications which deals with the combination of images of real world objects and computer generated object models. Many augmented reality applications are concerned with the use of streaming image information which is digitally processed and augmented by the addition of computer object models. For instance, an augmented reality user may utilize a user device upon which the user may see the real world displayed as an image together with object model images projected on top of that real world image.

Existing AR systems lack the ability to automatically recognize real world objects in a scene (or displayed image) and determine (and record) each object's position (e.g., in a room) and/or each object's orientation. A user, accordingly, might be relegated to a tedious process of searching through one or more catalogs of product images and information to identify the objects in the real world scene and/or associate those objects with computer-generated object models (or other objects) that match or would coordinate (i.e., "might go with") the real world object(s).

Embodiments of the invention address these and other problems, individually and collectively.

SUMMARY

Techniques described herein are directed to a system and methods for automatically generating a catalog of objects for a user which includes positional information. In some embodiments, each object in the catalog of objects may be associated with an object model, which may be any suitable representation of an object. In some embodiments, an object in an image may be replaced by an object model such that the object model appears to be positioned where the object is actually positioned within the image. The object model, as well as a position associated with an object model, may be provided to user devices in order for images depicted on those user devices to be augmented to include the object models.

One embodiment of the disclosure is directed to a method of generating a catalog of positioned objects for a user, comprising receiving sensor output obtained using one or more input sensors of a user device, identifying, within the sensor output, one or more objects, determining, based on the sensor output and based on a location of the user device, a position of the one or more objects, mapping the one or more objects to one or more corresponding object models within an object model database, identifying that the one or more objects are to be associated with the user, and storing an indication of the one or more object models and the determined position of the one or more objects with respect to the user.

Another embodiment of the disclosure is directed to a system that comprises one or more camera devices, a processor, and a memory. In this system the memory includes instructions that, when executed with the processor, cause the system to, at least receive sensor data from the one or more camera devices, identify, within the sensor data, at least one object, the object being separate from an area in which the object is located, determine, based on the sensor data and a location of the one or more camera devices, a position of the at least one object, match the at least one object with at least one object model stored in an object model database, identify a user with which the at least one object is associated, store an indication of the at least one object model and the determined position of the at least one object with respect to the identified user.

Yet another embodiment of the disclosure is directed to an apparatus that comprises a camera device configured to capture image information, a depth sensor device configured to capture depth information, and a mobile application stored in a computer-readable medium. In this apparatus, the mobile application, when executed, causes the apparatus to, at least identify, within image information captured by the camera device, one or more objects, determine, based on a position of the one or more objects within the image information, a position of the one or more objects from depth information captured by the depth sensor, and provide, to a server device in communication with the apparatus, an indication of the one or more objects, the position of the one or more objects, and an identification of a user associated with the apparatus.

BRIEF DESCRIPTION OF THE DRAWINGS

Various embodiments in accordance with the present disclosure will be described with reference to the drawings, in which:

FIG. 5 depicts an illustrative example of a system in which a user may select an object to be replaced by a reconfigurable object model in accordance with at least some embodiments;

FIG. 6 depicts an illustrative example of a system in which a user may select an object and a position for that object in accordance with at least some embodiments;

FIG. 7A depicts an illustrative example of route guidance instructions that may be provided to a user in accordance with at least some embodiments;

FIG. 7B depicts an illustrative example of object placement instructions that may be provided to a user in accordance with at least some embodiments;

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
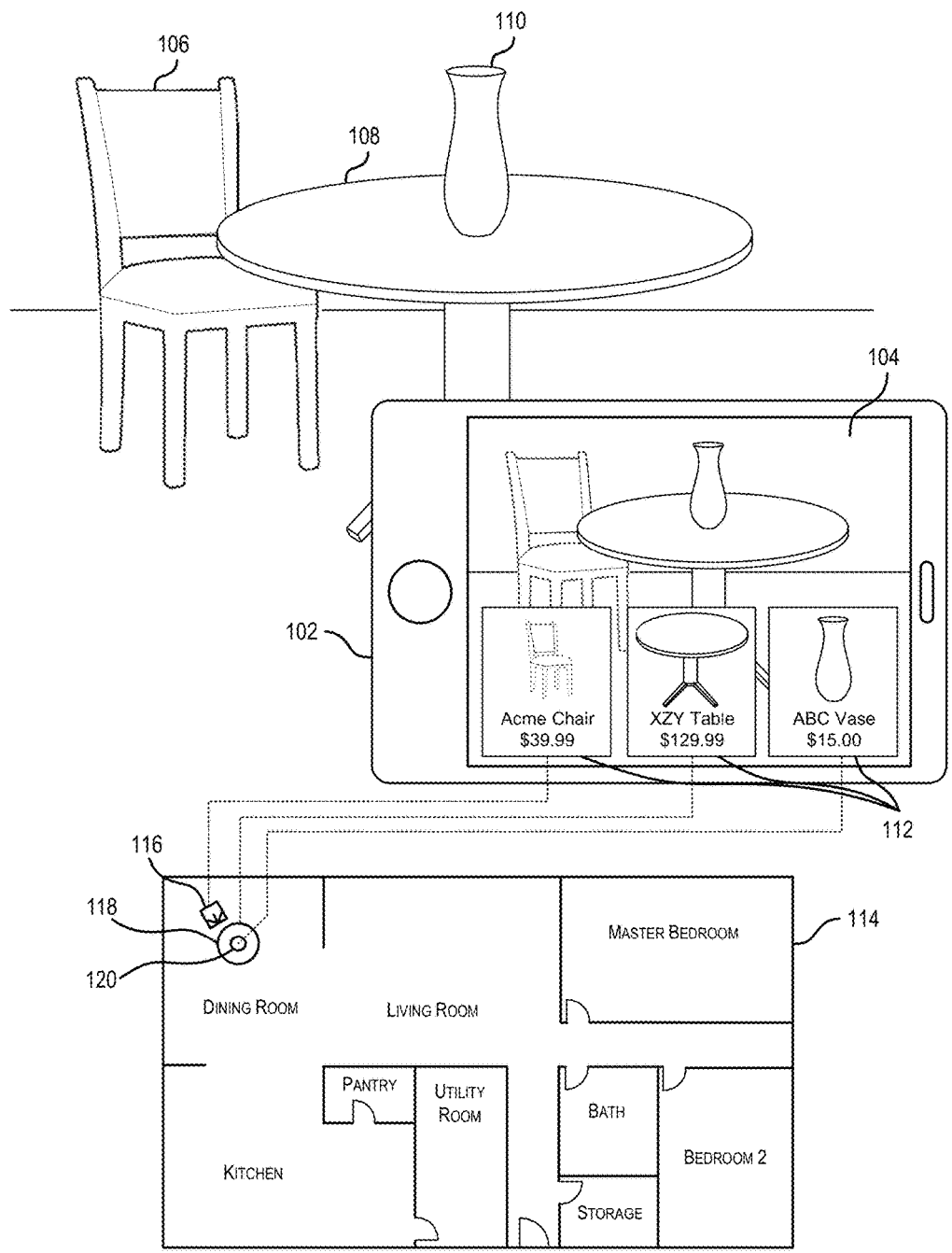
FIG. 1 depicts an illustrative example of a system in which records of objects and their positioning data may be generated automatically.

FIG. 1 depicts an illustrative example of a system in which records of objects and their positioning data may be generated automatically. In FIG. 1, a user device 102 may be used to capture an image 104 of a scene that includes a number of objects 106, 108, and 110. In accordance with at least some embodiments, the system may automatically (e.g., without user interaction) identify the objects within the scene and determine their respective locations. The location information, as well as other attribute information related to the objects, may then be used to identify attributes of an area or region.

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communication protocol.

When interacting with the system depicted in FIG. 1, a user may activate a mobile application installed upon, and executed from, a user device 102 and may subsequently scan an area that includes one or more objects. For example, upon activation of the mobile application or a function within the mobile application, the user device 102 may be caused to capture image and/or depth sensor output related to the scanned area using a camera and depth sensor of the user device 102. The mobile application may then cause the user device 102 to identify the one or more objects in the area using various object recognition techniques. In some embodiments, at least a portion of this processing may be performed upon the user device 102. In some embodiments, at least a portion of the processing may be performed by a mobile application server in communication with the user device 102.

In accordance with at least some embodiments, once the objects 106, 108, and 110 have been identified within the image information, the system may map the objects 112 to similar and/or corresponding objects within an object model database. In some embodiments, one or more machine learning techniques may be applied in order to identify corresponding object entries within an object model database. The object entries within the object model database may be associated with a number of attribute values.

In accordance with at least some embodiments, a user of, and/or an account associated with, the user device 102 may be identified. In some embodiments, the user/account may be identified based on a phone number or serial number associated with the user device 102. In some embodiments, the user may be asked to sign into an account upon execution of a mobile application on the user device 102, such that any actions performed using the mobile application may be automatically associated with the logged account.

Once the objects in the image 104 have been identified, the system may be further configured to determine a location for each of the objects. To do this, the system may determine a current position of the user device 102, as well as a position of each object relative to the user device 102. The relative position of the object with respect to the user device 102, as well as the position of the user device 102, may then be used to determine a position of the object. For example, the location of the user device 102 (e.g., geographic coordinates) may be combined with a distance of the object from the user device 102 in a particular direction (based on the orientation of the user device 102) to calculate a location of the object. In some embodiments, the system may also determine a direction that an object is facing.

In accordance with at least some embodiments, the system may maintain a layout 114 or other suitable area map (e.g., blueprint or floor plan) associated with a particular user or account. In these embodiments, the layout 114 may be updated to include an indication or reference to each of the objects at their respective locations. For example, references 116, 118, and 120 may be added to the layout 114 to represent corresponding real-world objects 106, 108, and 110 respectively. In some embodiments, the locations of the objects may be stored within a database, or other suitable data store, independent of any layout 114.

Figure 2:
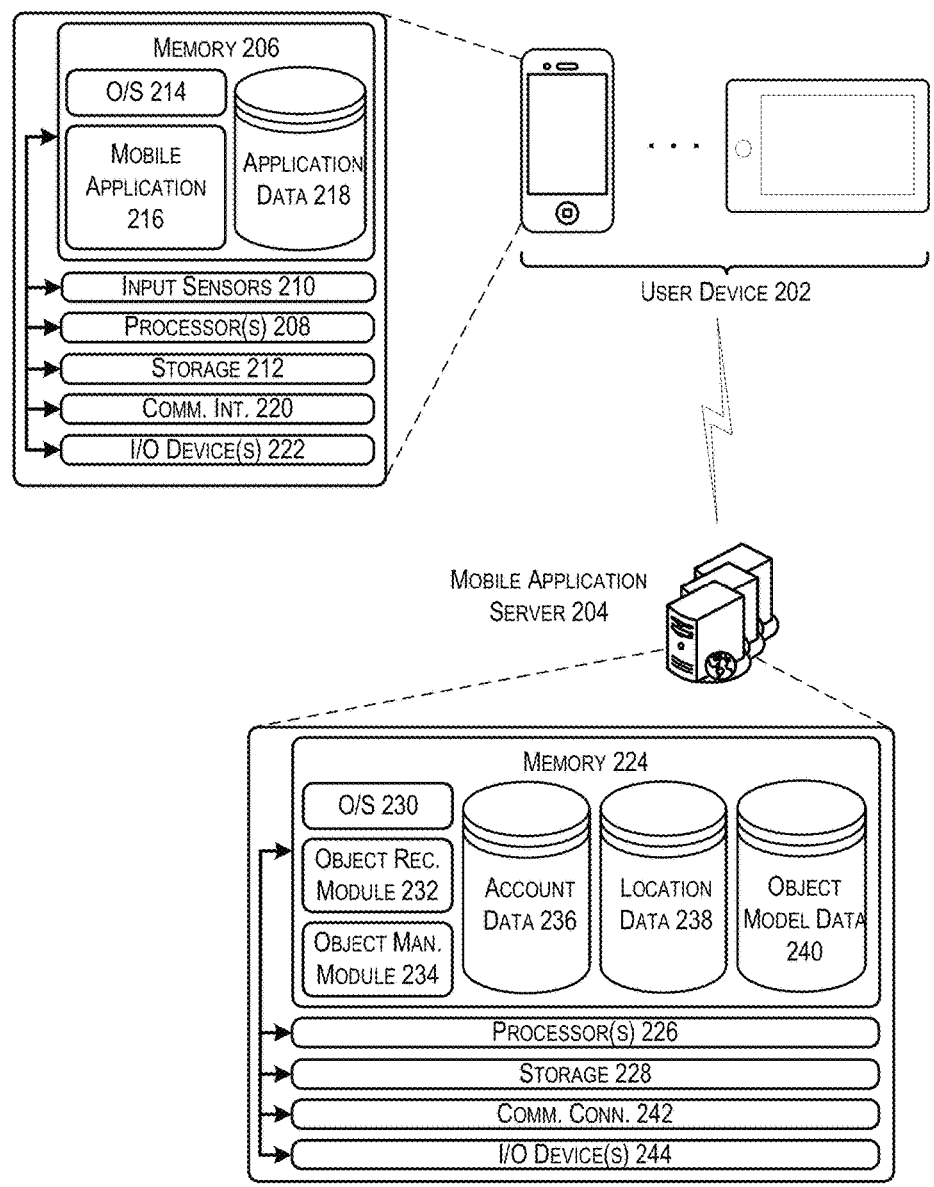
FIG. 2 depicts a system architecture for a system that generates records of objects and their locations in accordance with at least some embodiments.

FIG. 2 depicts a system architecture for a system that generates records of objects and their locations in accordance with at least some embodiments. In FIG. 2, a user device 202 may be in communication with a number of other components, including at least a mobile application server 204. The mobile application server 204 may perform at least a portion of the processing functions required by a mobile application installed upon the user device. The user device 202 may be an example of the user device 102 described with respect to FIG. 1.

A user device 202 may be any suitable electronic device that is capable of providing at least a portion of the capabilities described herein. In particular, the user device 202 may be any electronic device capable of identifying an object and its location. In some embodiments, a user device may be capable of establishing a communication session with another electronic device (e.g., mobile application server 204) and transmitting/receiving data from that electronic device. A user device may include the ability to download and/or execute mobile applications. User devices may include mobile communication devices as well as personal computers and thin-client devices. In some embodiments, a user device may comprise any portable electronic device that has a primary function related to communication. For example, a user device may be a smart phone, a personal data assistant (PDA), or any other suitable handheld device. The user device can be implemented as a self-contained unit with various components (e.g., input sensors, one or more processors, memory, etc.) integrated into the user device. Reference in this disclosure to an "output" of a component or an "output" of a sensor does not necessarily imply that the output is transmitted outside of the user device. Outputs of various components might remain inside a self-contained unit that defines a user device.

In one illustrative configuration, the user device 202 may include at least one memory 206 and one or more processing units (or processor(s)) 208. The processor(s) 208 may be implemented as appropriate in hardware, computer-executable instructions, firmware or combinations thereof. Computer-executable instruction or firmware implementations of the processor(s) 208 may include computer-executable or machine executable instructions written in any suitable programming language to perform the various functions described. The user device 202 may also include one or more input sensors 210 for receiving user and/or environmental input. There may be a variety of input sensors 210 capable of detecting user or environmental input, such as an accelerometer, a camera device, a depth sensor, a microphone, a global positioning system (e.g., GPS) receiver, etc. The one or more input sensors 210 may include at least a range camera device (e.g., a depth sensor) capable of generating a range image, as well as a camera device configured to capture image information.

For the purposes of this disclosure, a range camera (e.g., a depth sensor) may be any device configured to identify a distance or range of an object or objects from the range camera. In some embodiments, the range camera may generate a range image (or range map), in which pixel values correspond to the detected distance for that pixel. The pixel values can be obtained directly in physical units (e.g., meters). In at least some embodiments of the disclosure, the 3D imaging system may employ a range camera that operates using structured light. In a range camera that operates using structured light, a projector projects light onto an object or objects in a structured pattern. The light may be of a range that is outside of the visible range (e.g., infrared or ultraviolet). The range camera may be equipped with one or more camera devices configured to obtain an image of the object with the reflected pattern. Distance information may then be generated based on distortions in the detected pattern. It should be noted that although this disclosure focuses on the use of a range camera using structured light, any suitable type of range camera, including those that operate using stereo triangulation, sheet of light triangulation, time-of-flight, interferometry, coded aperture, or any other suitable technique for range detection, would be useable by the described system.

The memory 206 may store program instructions that are loadable and executable on the processor(s) 208, as well as data generated during the execution of these programs. Depending on the configuration and type of user device 202, the memory 206 may be volatile (such as random access memory (RAM)) and/or non-volatile (such as read-only memory (ROM), flash memory, etc.). The user device 202 may also include additional storage 212, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 206 may include multiple different types of memory, such as static random access memory (SRAM), dynamic random access memory (DRAM) or ROM. Turning to the contents of the memory 206 in more detail, the memory 206 may include an operating system 214 and one or more application programs or services for implementing the features disclosed herein including at least a mobile application 216. The memory 206 may also include application data 218, which provides information to be generated by and/or consumed by the mobile application 216. In some embodiments, the application data 218 may be stored in a database.

For the purposes of this disclosure, a mobile application may be any set of computer executable instructions installed upon, and executed from, a user device 202. Mobile applications may be installed on a user device by a manufacturer of the user device or by another entity. In some embodiments, the mobile application may cause a user device to establish a communication session with a mobile application server 204 that provides backend support for the mobile application. A mobile application server 204 may maintain account information associated with a particular user device and/or user. In some embodiments, a user may be required to log into a mobile application in order to access functionality provided by the mobile application 216.

In accordance with at least some embodiments, the mobile application 216 may be configured to identify objects within an environment surrounding the user device 202. In accordance with at least some embodiments, the mobile application 216 may receive output from the input sensors 210 and identify objects or potential objects within that output. For example, the mobile application 216 may receive depth information (e.g., a range image) from a depth sensor (e.g., a range camera), such as the depth sensors previously described with respect to input sensors 210. Based on this information, the mobile application 216 may determine the bounds of an object to be identified. For example, a sudden variance in depth within the depth information may indicate a border or outline of an object. In another example, the mobile application 216 may utilize one or more machine vision techniques to identify the bounds of an object. In this example, the mobile application 216 may receive image information from a camera input sensor 210 and may identify potential objects within the image information based on variances in color or texture data detected within the image. In some embodiments, the mobile application 216 may cause the user device 202 to transmit the output obtained from the input sensors 210 to the mobile application server 204, which may then perform one or more object recognition techniques upon that output. Additionally, the mobile application 216 may cause the user device 202 to transmit a current location of the user device 202 as well as an orientation (e.g., facing) of the user device 202 to the mobile application server 204.

The user device 202 may also contain communications interface(s) 220 that enable the user device 202 to communicate with any other suitable electronic devices. In some embodiments, the communication interface 220 may enable the user device 202 to communicate with other electronic devices on a network (e.g., on a private network). For example, the user device 202 may include a Bluetooth wireless communication module, which allows it to communicate with another electronic device (e.g., a Bluetooth laser measuring tape, etc.). The user device 202 may also include input/output (I/O) device(s) and/or ports 222, such as for enabling connection with a keyboard, a mouse, a pen, a voice input device, a touch input device, a display, speakers, a printer, etc.

In some embodiments, the user device 202 may communicate with the mobile application server 204 via a communication network. The communication network may include any one or a combination of many different types of networks, such as cable networks, the Internet, wireless networks, cellular networks, and other private and/or public networks. In addition, the communication network may comprise multiple different networks. For example, the user device 202 may utilize a wireless local area network (WLAN) to communicate with a wireless router, which may then route the communication over a public network (e.g., the Internet) to the mobile application server 204.

The mobile application server 204 may be any computing device or plurality of computing devices configured to perform one or more calculations on behalf of the mobile application 216 on the user device 202. In some embodiments, the mobile application 216 may be in periodic communication with the mobile application server 204. For example, the mobile application 216 may receive updates, push notifications, or other instructions from the mobile application server 204. In some embodiments, the mobile application 216 and mobile application server 204 may utilize a proprietary encryption and/or decryption scheme to secure communications between the two. In some embodiments, the mobile application server 204 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the mobile application server 204 may include at least one memory 224 and one or more processing units (or processor(s)) 226. The processor(s) 226 may be implemented as appropriate in hardware, computer-executable instructions, firmware or combinations thereof. Computer-executable instruction or firmware implementations of the processor(s) 226 may include computer-executable or machine executable instructions written in any suitable programming language to perform the various functions described.

The memory 224 may store program instructions that are loadable and executable on the processor(s) 226, as well as data generated during the execution of these programs. Depending on the configuration and type of mobile application server 204, the memory 224 may be volatile (such as random access memory (RAM)) and/or non-volatile (such as read-only memory (ROM), flash memory, etc.). The mobile application server 204 may also include additional storage 228, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 224 may include multiple different types of memory, such as static random access memory (SRAM), dynamic random access memory (DRAM) or ROM. Turning to the contents of the memory 224 in more detail, the memory 224 may include an operating system 230 and one or more application programs or services for implementing the features disclosed herein including at least a module for mapping objects identified by the mobile application 216 to objects in an object model database (object recognition module 232) and/or a module for managing object data (object management module 234). The memory 224 may also include account data 236, which provides information associated with user accounts maintained by the described system, location data 238, which provides information related to object locations as well as layout information, and/or object model database 240, which provides information on a number of objects. In some embodiments, one or more of the account data 236, the location data 238, or the object model database 240 may be stored in a database. In some embodiments, the object model database 240 may be an electronic catalog that includes data related to objects available from a resource provider, such as a retailer or other suitable merchant.

The memory 224 and the additional storage 228, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, the term "modules" may refer to programming modules executed by computing systems (e.g., processors) that are installed on and/or executed from the mobile application server 204. The mobile application server 204 may also contain communications connection(s) 242 that allow the mobile application server 204 to communicate with a stored database, another computing device or server, user terminals, and/or other components of the described system. The mobile application server 204 may also include input/output (I/O) device(s) and/or ports 244, such as for enabling connection with a keyboard, a mouse, a pen, a voice input device, a touch input device, a display, speakers, a printer, etc.

Turning to the contents of the memory 224 in more detail, the memory 224 may include the object recognition module 232, the object management module 234, the database containing account data 236, the database containing location data 238, and/or the database containing object model data 240.

In some embodiments, the object recognition module 232 may be configured to, in conjunction with the processors 226, receive input sensor data from the user device 202 and identify one or more objects within the input sensor data. As described above, the system may use any suitable object recognition technique to identify the objects within the input sensor data. In some embodiments, the object recognition module 232 may use one or more machine learning techniques to map at least a portion of the received input sensor data to data stored in an object model database 240. For example, the object recognition module 232 may compare point cloud data obtained via the input sensors 210 (or other information derived from such point cloud data) to point cloud information (or other object-indicative information) stored in the object model database 240. In this way, the object recognition module 232 may map the received sensor input data to a number of objects in the object model database 240. In embodiments in which the object model database 240 is maintained by a resource provider (e.g., a merchant or other retailer), the object model database 240 may include object entries even for objects which are not provided by the resource provider. In other words, the object model database 240 may include more object entries than products that it provides. The object recognition module 232 may attempt to identify an object with varying degrees of specificity. For example, in some embodiments, the object recognition module 232 may identify a basic category of an item (e.g., this object is a chair). In some embodiments, the object recognition module 232 may attempt to identify a particular subcategory of the item such as a brand, model, or version (e.g., this object is an ACME brand cherry wood armless chair).

In some embodiments, the object management module 234 may be configured to, in conjunction with the processors 226, manage information for the objects identified by the object recognition module 232. In some embodiments, object information may be obtained with respect to a particular account or user. Once an object is identified by the object recognition module 232, the object management module 234 may determine position information for the object. To do this, the object management module 234 may use the orientation of the user device 202 (which may be received from the mobile application 216) to determine a direction of the object with respect to the user device 202. The object management module 234 may use the geographic location of the user device 202 (which may also be received from the mobile application 216) and depth information (which may be obtained from the depth sensor output) to determine coordinates of the object when paired with the determined direction. The object management module 234 may then store an indication that the object is positioned at the determined coordinates. In some embodiments, the object management module 234 may also identify a pose (e.g., an orientation) of the object at the determined coordinates. For example, the object management module 234 may determine which direction the object is facing and store an indication of that facing.

Although the use of depth sensor output is described in identifying a distance between the user device 202 and the object, it should be noted that other techniques may be used to determine such a distance. For example, a size of the object depicted within the image may be compared to a size of the object indicated in the object model database and a distance between the user device 202 and the object may be determined as a function of the difference in those sizes. In another example, the object management module 234 may identify other objects within the received input sensor data that have a known size and may determine a distance between the object and the user device 202 based on the object's position with respect to those other objects.

In some embodiments, each of the object entries within the object model database 240 may be associated with a three-dimensional (3D) model of that object. In these embodiments, the 3D model may be provided to the mobile application 216 such that the user device 202 is caused to display the 3D model on a display of the user device in a way that the object associated with the 3D model is depicted as appearing in the location stored in association with the object. In some embodiments, image extrapolation or other techniques may be used to remove the information related to the object from the depicted image so that the depicted 3D model replaces the input sensor output related to the object within the image. For example, the mobile application 216 may use augmented reality to depict an image of the 3D model over an image of an actual scene captured using a user device 202 while the actual image of that object is hidden within the scene (e.g., using image extrapolation). The mobile application 216 may enable a user of the user device 202 to move or otherwise reposition the 3D model of the object in order to see how the object would appear in a new position. In accordance with at least some embodiments, 3D models may be identified for each object identified by the object recognition module 232. The 3D models may then be depicted over each of the identified objects within the captured image information so that they might appear to be moved or altered without actually physically moving the real object depicted in the image.

Figure 3:
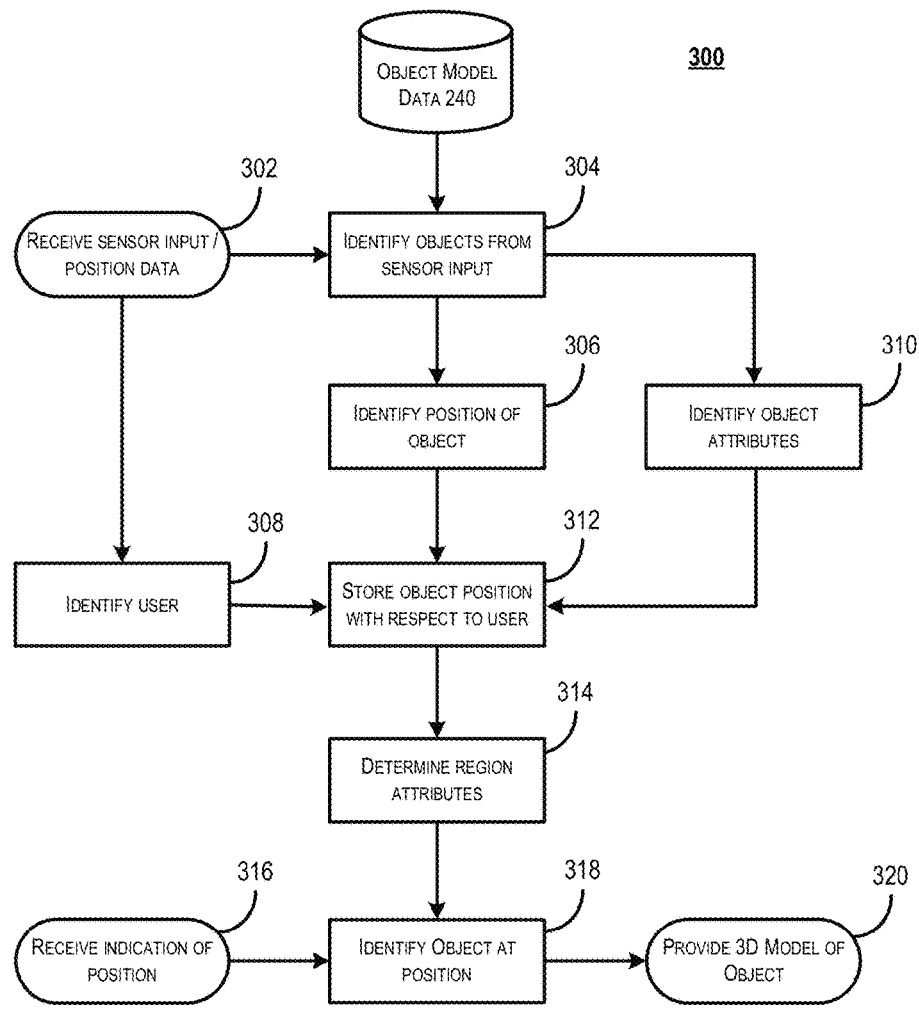
FIG. 3 depicts a flow chart illustrating a process for determining region attributes based on object and object location records in accordance with at least some embodiments.

FIG. 3 depicts a flow chart illustrating a process for determining region attributes based on object and object location records in accordance with at least some embodiments. Some or all of the process 300 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Process 300 may be performed by an example user device 202, a mobile application server 204, and various other components, each of which is depicted with respect to FIG. 2.

Process 300 may begin at 302, when the system receives sensor output, as well as position data, obtained from a user device. As described elsewhere, the sensor output may include image information as well as depth sensor output. In some embodiments, the sensor output may be received as a stream of data. For example, the input sensor data may be received as a video stream. In some embodiments, at least a portion of the process 300 described herein may be performed at a user device. For example, objects may be identified within sensor output by the user device. In some embodiments, process 300 may be performed entirely by a mobile application server in communication with a user device (e.g., mobile application server 204 of FIG. 2). The sensor output may include multiple outputs from multiple types of sensors. For example, in some embodiments, the sensor output may include both image information captured by a camera device as well as a depth map captured using a depth sensor.

At 304, the process may involve identifying one or more objects within the received sensor output. As described elsewhere in this disclosure, there are a number of techniques for identifying particular objects within sensor output. In some embodiments, the system may use image information as well as depth information to identify objects. For example, the system may identify bounds of an object using edge detection (e.g., by detecting discontinuities in brightness, color, and/or texture). The system may then generate a point cloud from the depth information corresponding to the identified bounds within a depth map. Once a point cloud has been generated, it may be compared to point cloud information stored in object model data 240 with respect to a number of objects in order to identify similarities between the point cloud data. In some embodiments, a machine learning technique, such as deep learning techniques, may be used to identify an object from the object model data 240 that matches an object in the input sensor output. Additionally, the system may determine, based on the matched object model information, a facing or orientation of the object identified in the image information.

At 306, the process may involve determining a position for each of the objects identified in the sensor output at 304. To do this, the system may identify an orientation of a user device from which the sensor output is received. For example, the system may receive orientation information from a compass device installed upon the user device. From this orientation information, the system is able to determine a direction in which the object is located from the user device. For example, the image information obtained from a user device may depict a first object. Upon determining that the user device was facing the northwest at the time that the image was captured, the system is able to determine that the first object is located northwest of the user device. In addition, the depth sensor output may be used to determine a distance of the first object from the user device. The first object's position relative to the user device can then be determined based on the distance from the user device to the first object and the orientation of the user device. This relative location may then be used, in concert with a geographic location of the user device (e.g., GPS coordinates), to estimate or calculate a location of the first object. For the purposes of this disclosure, position information for an object may include both location information as well as orientation information. In some embodiments, the object model data 240 may include an indication of a particular face or side of the object which represents a "front" of the object. The system may determine, by comparing a point cloud or image of the object to a corresponding point cloud or image within the object model data 240, a particular orientation of the object within the sensor output.

At 308, the process may involve identifying a user associated with the user device from which the sensor output and position data was received. In some embodiments, the user may be identified based on a phone number associated with the user device. For example, a phone number from which the sensor output is received may be mapped to a particular account or user with which to associate the sensor output. In some embodiments, the user may be identified based on an account to which the user has logged in via the user device. The system may maintain a catalog of objects owned by, or in the possession of, a particular user. A catalog of objects maintained with respect to each user may also contain position information for each of the objects.

At 310, the process may involve identifying one or more attributes of the objects identified in the sensor output at 304. In some embodiments, once the object is mapped to a corresponding object identified within the object model data 240, the system may identify a number of attributes of the object. For example, the system may identify a model or version of the object. The system may identify a current value of the object (e.g., a cost to replace the object or a price at which the object was purchased). In some embodiments, the current value of the object may be depreciated or appreciated according to an age of the object as well as an appreciation/depreciation function for that item. In some embodiments, the system may maintain an indication of a style associated with the item. For example, the system may maintain an indication that a particular object is a "modern" style object. At 312, the process may involve generating a record of the identified objects and their positions to be stored with respect to the identified user.

At 314, the process may optionally involve determining attributes of a region based on the objects determined to be within that region and the identified attributes of those objects. By way of a first example, if the majority of the objects collocated within a particular region or area (e.g., a room) are classified as "modern" objects, then the system may determine that the overall style of the area is "modern." This information may then be used to make appropriate recommendations for additional objects to be added to the area, in that only objects matching that style may be recommended. In another example, current values of the objects in an area may be summed to determine an overall value of the area. In a scenario in which some adverse event (e.g., a flood, a fire, a burglary, etc.) impacts an entire area, this enables a quick and precise assessment of damages. In yet another example, color and/or material attributes may be retrieved for each object in order to determine a theme or color scheme associated with the area. In some embodiments, attributes indicating a type of each object within an area may be used to determine a classification for an area. For example, an area that includes a desk and a printer may be determined to be an office or den, even if the room is classified as a bedroom in a floorplan maintained for the area.

At 316, the system may receive an indication that a user device (either the user device from which the sensor output was received or a different user device) is within a vicinity of the position stored in association with the object. For example, a user may execute a mobile application on a user device that causes it to communicate the location of the user device to a mobile application server as described herein. Upon receiving that location information, the mobile application server may identify any objects within the vicinity (e.g., within a predetermined distance from the user device) at 318. Once the mobile application server has identified one or more objects within the vicinity of the user device, the mobile application server may retrieve object models (e.g., 3D representations of the object) from the object model data 240. These object models may be transmitted to the user device at 320.

Upon receiving the object models from the mobile application server, the user device that received the models may use augmented reality techniques to depict the object model in an image instead of an actual depiction of the object. For example, the user device may use image extrapolation to remove an actual representation of the object within an image captured by the user device. The user device may then display the received object model in the position of the object so that it appears to be the actual object. In this example, the user may be provided with the ability to move the object model within the image in order to ascertain how an area would appear with the object moved. Additionally, the user may be provided with the ability to replace the object model with a different object model in order to ascertain how an area would appear with the object replaced. In some embodiments, the process 300 may be performed with respect to different modes of operation. For example, the steps 302 through 312 may be performed with respect to a first user device in "capture" mode, whereas steps 316 through 320 may be performed with respect to a second user device (which may be the same user device as the first user device) in "edit" mode.

Figure 4:
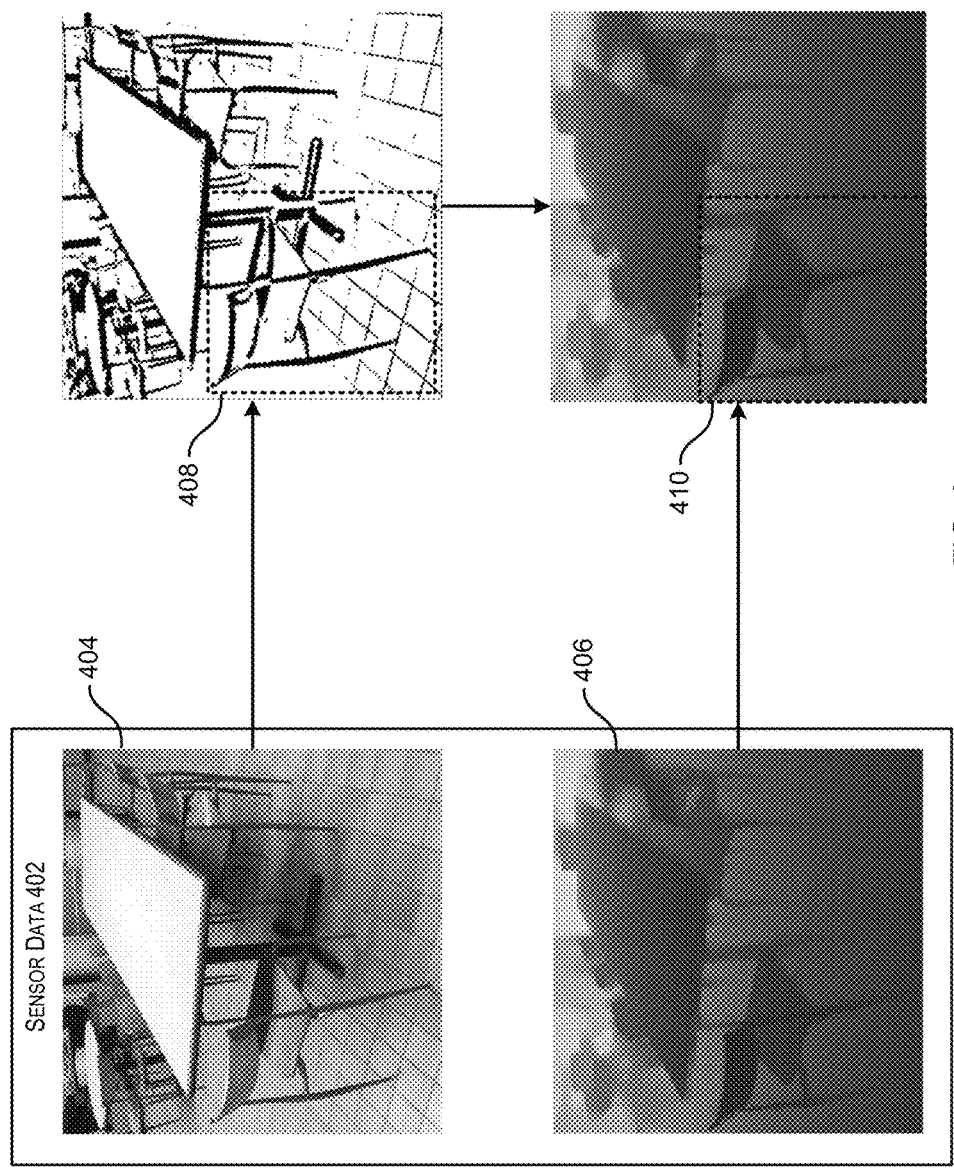
FIG. 4 depicts an illustrative example of a technique for identifying objects within sensor data in accordance with at least some embodiments.

FIG. 4 depicts an illustrative example of a technique for identifying objects within sensor data in accordance with at least some embodiments. In accordance with at least some embodiments, sensor data 402 may be obtained from one or more input sensors installed upon a camera device. In some embodiments, the sensor data 402 may include image information 404 captured by a camera device as well as depth map information 406 captured by a depth sensor.

In some embodiments, the sensor data 402 may include image information 404. One or more image processing techniques may be used on image information 404 in order to identify one or more objects within that image information 404. For example, edge detection may be used to identify a section 408 within the image information that includes an object. To do this, discontinuities in brightness, color, and/or texture may be identified across an image in order to detect edges of various objects within the image. Section 408 depicts an illustrative example image of a chair in which these discontinuities have been emphasized.

In some embodiments, the sensor data 402 may include depth information 406. In depth information 406, a value may be assigned to each pixel that represents a distance between the user device and a particular point corresponding to the location of that pixel. The depth information 406 may be analyzed to detect sudden variances in depth within the depth information 406. For example, sudden changes in distance may indicate an edge or a border of an object within the depth information 406.

In some embodiments, the sensor data 402 may include both image information 404 and depth information 406. In at least some of these embodiments, objects may first be identified in either the image information 404 or the depth information 406 and various attributes of the objects may be determined from the other information. For example, edge detection techniques may be used to identify a section of the image information 404 that includes an object 408. The section 408 may then be mapped to a corresponding section 410 in the depth information to determine depth information for the identified object (e.g., a point cloud). In another example, a section 410 that includes an object may first be identified within the depth information 406. In this example, the section 410 may then be mapped to a corresponding section 408 in the image information to determine appearance attributes for the identified object (e.g., color or texture values).

In some embodiments, various attributes (e.g., color, texture, point cloud data, object edges) of an object identified in sensor data 402 may be used as input to a machine learning module in order to identify a particular object within an object model database that matches the identified object. In some embodiments, a point cloud for the object may be generated from the depth information and/or image information and compared to point cloud data stored in the object model database. Although particular techniques are described, it should be noted that there are a number of techniques for identifying particular objects from sensor output.

FIG. 5 depicts an illustrative example of a system in which a user may select an object to be replaced by a reconfigurable object model in accordance with at least some embodiments. In FIG. 5, an object 502 is depicted as being placed within a scene. An image of the scene is then captured and displayed using a user device 504. As depicted in FIG. 5, a user may then be provided the ability to see how the scene would appear after reconfiguring (e.g., repositioning) the object 502. To do this, a section 506 of the captured image may be identified as including a depiction of the object 502. Portions of the image surrounding the section 506 may then be used to extrapolate how the section 506 would appear without the object 502. An image displayed upon the user device 504 may then be augmented to include the extrapolated section appearance information at the location of the section 506, effectively hiding the object 502 within the displayed image. Additionally, the object 502 may be mapped to an object model 508 stored in an object model database. An object model may be any virtual representation of a physical object. The displayed image may then be further augmented so that the object model 508 is depicted at section 506 in the same position as the object 502. Once depicted, the object model 508 may be moved or otherwise repositioned by a user of the user device 504.

In some embodiments, various functionalities of the system described herein may be performed by a mobile application installed upon a user device 504. In some embodiments, a mobile application, as described herein, may include multiple modes of operation. For example, the mobile application installed upon the user device 504 may include a capture mode which enables identification of objects, as well as an edit mode which enables reconfiguration of depicted object models. In some embodiments, the mobile application may perform each of the described functions with respect to a single mode.

During a capture phase, a user device 504 may capture, using a camera device installed upon the user device 504, image information with respect to a scene that includes the object 502. In some embodiments, the image information may include streaming image information (e.g., image information that is constantly updated with new information) of a scene. In some embodiments, objects (e.g., 502) within the scene are automatically identified within the image information. In some embodiments, a user may select an object within the image to be identified. For example, a user may select the representation of the refrigerator 502 depicted on the screen of the user device 504 in order to initiate an object identification process. In some embodiments, the user device 504 may prompt the user for a type or category with which the object 502 may be classified. For example, the user, after selecting the representation of the refrigerator 502 within the image, may then provide an indication that the selected object is a refrigerator. In some embodiments, the user device 504 may also obtain information related to an area surrounding the representation of the object 502. The information related to the area surrounding the representation of the object 502 may be used to extrapolate a depiction of the section 506 occupied by the object 502 without the object 502 within the scene. Additionally, depth sensor output may be used to identify locations of points within the scene. For example, the depth sensor output may be used to determine a distance between the user device 504 and the object 502 or another object, a point on a wall, a point on a ceiling, or a point on a floor.

In some embodiments, the system is able to automatically identify a number of objects to be associated with a user. For example, using the system described herein, a user may pan the user device throughout a space (e.g., a house) in order to automatically generate positional records for a number of objects. In this example, objects identified within the image information (e.g., using techniques described with respect to FIG. 4 above) are automatically identified and associated with the user of the user device 504. In this way, a catalog of objects and their respective positions may be generated for a particular user with minimal effort. In some embodiments, attributes for each of the catalogued objects may be identified from an object model database and associated with the catalog entries. For example, upon adding an object to the catalog of objects for a user, the system may determine a retail price or other cost associated with the object within the object model catalog and may subsequently associate that cost with the object for the user. For example, a cost attribute value may be populated with the retail price of the object as determined from the object model database.

During an edit phase, a user device 504 may display a captured scene which has been augmented in accordance with the techniques described herein. In particular, a section 506 of the image that corresponds to a location of the object 502 may be augmented to include a representation of the appearance of the scene without the object 502. Additionally, the image may initially be further augmented to include an object model 508 associated with the object 502 so that it is depicted in the same position as the object 502 within the scene. The user is then able to select the object model 508 (e.g., using a touch screen or cursor) and move or otherwise reposition the object within the scene. In some embodiments, the user may pan the user device 504 to place the object model in a position not originally depicted in the initial scene. In some embodiments, the user may alter an orientation of the object model 508 (e.g., by rotating the object model 508). Based on a position in which the user places the object model 508, various attributes of the object model 508 may be altered. For example, a size of the object model 508 may be increased or decreased depending on whether a new selected position of the object model within the image is closer to, or further away from, the user device 504 as determined based on depth information. Additionally, the appearance of the object model 508 may be altered based on a side or face of the object model 508 exposed to the user device 504.

In accordance with at least some embodiments, the system described herein may store an indication of a current position of the object 502 as well as an indication of the position of the object model 508 selected by a user based upon its reconfigured position within the image. Various embodiments of the system, as well as systems that use the positional information for the object, may require that both the current position of the object and the position of the object selected by the user be provided. For example, if a user wishes to move an object, he or she may capture an image of the object in its current position. The user may then move the object model to a new position. The system may then provide both the current position and the selected position to a third party entity (e.g., a moving company). The positional information may then be used to guide the third party entity to the current location of the object as well as to the selected location. The selected position information may also provide a visual indication of how the object is to be placed in the new location to the third party entity. It should be noted that in this example, the current position and the selected position may be within separate buildings (e.g., different houses). In another illustrative example, rather than move an object model 508 from a current position to a selected position, a user may select an object within a catalog of objects maintained with respect to that user. The user may then place the object in a particular position directly from the catalog of objects. At least some of these embodiments will be described in greater detail with respect to FIG. 6 below.

FIG. 6 depicts an illustrative example of a system in which a user may select an object and a position for that object in accordance with at least some embodiments. As depicted, an image of a scene 602 may be captured using a user device 604. In some embodiments, the user may select one or more object models 606 from a set of available objects 608 to place within a scene 602. For the purposes of this disclosure, "placing" an object within a scene may involve augmenting an image of the scene so that an object model associated with that object appears to be rendered in a selected position within the image. In some embodiments, the set of available objects 606 may include a number of visual representations 608 of the objects (e.g., 2D or 3D representations). In some embodiments, the set of available objects 606 may include one or more attributes associated with each of the objects 608.

In some embodiments, the set of available objects 606 may be a catalog of objects associated with a particular user. For example, a user may use embodiments of the mobile application described herein to generate a catalog of objects and their respective positions. In some embodiments, techniques described above with respect to FIG. 5 may be used to generate a catalog of objects for the user in this manner. Once a catalog of objects has been generated for a user, the user may be provided with the ability to select objects from the catalog of objects and place those objects within a scene. In some embodiments, the user may be provided with the ability to scroll through the set of available objects 606. In some embodiments, the user may be provided with the ability to place one of, or each of, the objects in the set of available objects 606. In some embodiments, the user may be provided the ability to place as many of the objects as the user owns. Once placed, the system may identify a position in which the object has been placed and may store that placed position with respect to each of the objects in the set of available objects.

In some embodiments, the set of available objects 606 may include one or more objects available for acquisition by a user. For example, the set of available objects 606 may include at least one object from an electronic catalog maintained by an electronic retailer. In this example, the electronic catalog may include a number of objects available for purchase by a user. In some embodiments, the set of available objects 606 may include objects which have already been purchased by the user. In some embodiments, the set of available objects 606 may include objects that may be purchased by the user. For example, the user may place an object in a particular position and, upon determining that he or she likes the object in the particular position, may elect to purchase the object. In this example, the position of the object selected by the user may be provided to the electronic retailer along with the purchase transaction for the object. Upon shipment of the object to the user, an assembler for the retailer may assemble or install the object in the position selected by the user.

In some embodiments, the system may provide the object model, an indication of the object model, a current position of the object, and/or a placed position of the object to a third party entity (e.g., an entity unaffiliated with the system). For example, the user may request that object position information may be provided to a repairman or object assembler in order to request repair or assembly of the object.

In some embodiments, the system may identify one or more objects that a user may be interested in and provide a recommendation for those objects. A user's potential interest in an object may be determined in a number of ways. For example, the system described herein may determine, based on objects positioned in an area and based on the color and décor of these objects, a theme or style of that area (e.g., modern, classic, etc.). The system may then determine what object types, if any, are not currently in the area but are appropriate to that area. For example, a machine learning technique may be used to assess what type of space the area is (e.g., living room, dining room, etc.) and assess the object colors and styles present based on the objects within that space. In this example, the machine learning technique may identify a list of objects that may typically be located within such a space based on other spaces of that type. The system may then assess the types of objects detected within the space to determine what types of objects are not present from the list. In some embodiments, the system may filter the list by determining which of the objects not present from the list can actually fit within the space.

Upon determining that a user's space is lacking any particular type of object, the system may identify a particular object of that type which matches the determined style or theme for the area. The identified object may then be recommended to the user. For example, the system may retrieve an object model associated with the identified object and transmit that object model to the user device. Upon receiving the object model, the user device may display the object model using augmented reality within the scene 602. In some embodiments, the object model may be added to the set of available objects 606, so that the user may place the object model within the scene. The user may be given the option to purchase the recommended object. If the recommended object is purchased by the user, then the purchase transaction may then be associated with the location in which the user placed the object so that an installer or assembler may install or assemble the recommended object in the placed position.

By way of illustrative example of the above, consider a scenario in which a user scans the objects in his or her living room. In this example, the system may detect and catalog a number of modern-style objects within the living room. The system may also determine that the objects are predominately blue and gray in color. The system may determine, based on the types of detected objects in the room, that the room is a living room. Upon making this determination, the system may compare the detected objects to a list of objects in a typical living room to determine what other objects may be appropriate for the space. In this scenario, assume that the system determines that a typical living room may include an armchair and that none of the detected objects is an arm chair. Based on this, the system may determine that a user might be interested in purchasing an armchair. The system may then identify one or more armchairs in an electronic catalog which are of modern style and are colored some combination of blue and/or gray. In some embodiments, the system may filter the list of blue/gray modern armchairs by determining, for each identified armchair, whether there is sufficient space in the user's living room for that armchair. The system may then recommend one or more of the armchairs to the user by presenting an augmented view of the armchair on the display of the user device, which may depict the armchair in a space within the living room. The image of the armchair may be highlighted for the user with some label. For example, the image of the armchair may include the word "suggested" to indicate that the armchair is a recommended object, it may include a price for the armchair, and/or it may include a hyperlink to an e-commerce site where the arm chair can be purchased.

In some embodiments, the object to be recommended to the user for his or her space may be determined based on incentives provided to the system administrator. For example, vendors of objects may pay or otherwise compensate the system administrator for each object recommended to a user. In some embodiments, a number of vendors may bid against each other to increase the likelihood that their objects will be recommended. In some embodiments, the system administrator may provide a recommendation for an object with the highest markup or an object with the lowest or highest inventory turnover.

In some embodiments, the object to be recommended to the user for his or her space may be determined based on demographic data or historical data for that user. For example, a target user's purchase history may be compared to the purchase histories of other users in order to identify users similar to the target user. Once a list of comparable users have been identified, the system may identify other objects purchased by the comparable users that are not in the electronic catalog generated for the target user. The system may than assess each object in the list of purchased objects in order to determine whether that object would fit in a space available to the target user as well as whether it would match the décor or style of objects owned by that user. Upon determining that the objects would both fit and match, the system may determine that the target user may be interested in the objects and may provide a recommendation for those objects. In some embodiments, objects may be recommended by augmenting an image of a space to include a 3D representation of the objects so that they appear to be in a space which the system determined those objects would fit within.

It should be noted that object recommendations may be generated on a person-by-person basis, a room-by-room basis, or some combination of the two. For example, the system may match color styles and/or themes of a particular room while being constrained by user requirements. Furthermore, the machine learning techniques described herein may be trained using any database of spaces, including third party databases. For example, the system may consume room image data provided by ZILLOW or some other housing marketplace to identify typical objects that would belong in a type of space.

FIG. 7 depicts an illustrative example of a system in which a user may be provided with an indication of where to place an object in accordance with at least some embodiments. In FIG. 7, a first user may select an object and identify a position for that object in accordance with techniques described with respect to FIG. 6 above. The indication of the object, as well as its position, may then be provided to a second user in order to instruct the second user in performing a task related to the item. For example, the first user may be a purchaser of an item. In this example, the user may select a position in which he or she would like the item to be installed using techniques described with respect to FIG. 6 above. The object's selected position, as indicated by the first user, may then be provided to a user device operated by a second user who is to install or set up the item in the selected position.

For illustrative purposes, FIG. 7 is illustrated by FIG. 7A and FIG. 7B. FIG. 7A depicts an illustrative example of route guidance instructions that may be provided to a user in accordance with at least some embodiments. FIG. 7B depicts an illustrative example of object placement instructions that may be provided to a user in accordance with at least some embodiments.

As depicted in FIG. 7A, a user device 702 may be provided with position information for one or more items. In some embodiments, the user device 702 may display an indication of an object position 704. The indication of the object position 704 may be depicted with respect to a blueprint, floor plan or other layout 706, which may be stored with respect to a particular user. For example, one or more users may provide layout information to the system that represents a space belonging to that user. In some embodiments, the layout information may be obtained by the system via the mobile application installed upon the user device. For example, when information is obtained by the mobile application with respect to one or more objects, the mobile application may also assess a layout of the user's home. In this example, the mobile application may use depth sensor output obtained from the user device to determine the bounds of various rooms throughout the home.

In some embodiments, the mobile application may be configured to cause the user device 702 to display a route 708 or other suitable guidance to a location in which an object is positioned or is to be positioned. It will be appreciated that a number of route guidance techniques may be used to generate an appropriate route between the user device and the location, or intended location, of the object. In some embodiments, the user device 702 may provide a current location (e.g., GPS coordinates) to the system and the system may generate a route from the current location of the user device to the object position 704.

As depicted in FIG. 7B, the mobile application may be configured to cause the user device 702 to display an intended position of an object. For example, upon reaching the intended object position 704, the mobile application may be configured to cause the user device to augment an image of a scene to include the object model 710. The object model may be depicted as being positioned in such a way that the user had intended to position the object. This will allow the user of the user device to envision how the user (of the same device or another device) would like the object positioned, enabling that user to properly install or assemble the object.

By way of illustrating an example of the system described herein, consider a scenario in which a user wishes to relocate from one residence to another using such a system. In this scenario, the user may start by scanning, with a user device, areas of his or her existing residence in order to generate a record of objects that he or she owns as well as the respective positions of those objects as described with respect to FIG. 5 above. The user may then enter the new residence to which he or she wishes to move. Once at the new residence, the user may place object models corresponding to objects owned by the user into various positions throughout the new residence in accordance with techniques described with respect to FIG. 6 above. For each of the objects placed in this way, the system may maintain the current position of the object as well as the position in which the object model was placed by the user. Once the user has selected positions for each of his or her objects in the new residence, the user may cause the system to transmit the information to a moving company. In this example, employees of the moving company may receive at least the selected position for each object. When the moving company arrives at the new residence with the user's objects, the moving company employee(s) may be provided with explicit instructions as to how each object should be positioned as described with respect to FIGS. 7A and 7B. As illustrated above, the moving company employees may be provided with a route to a location in which a particular object is to be placed as well as an augmented view depicting the object in its appropriate position.

Figure 8:
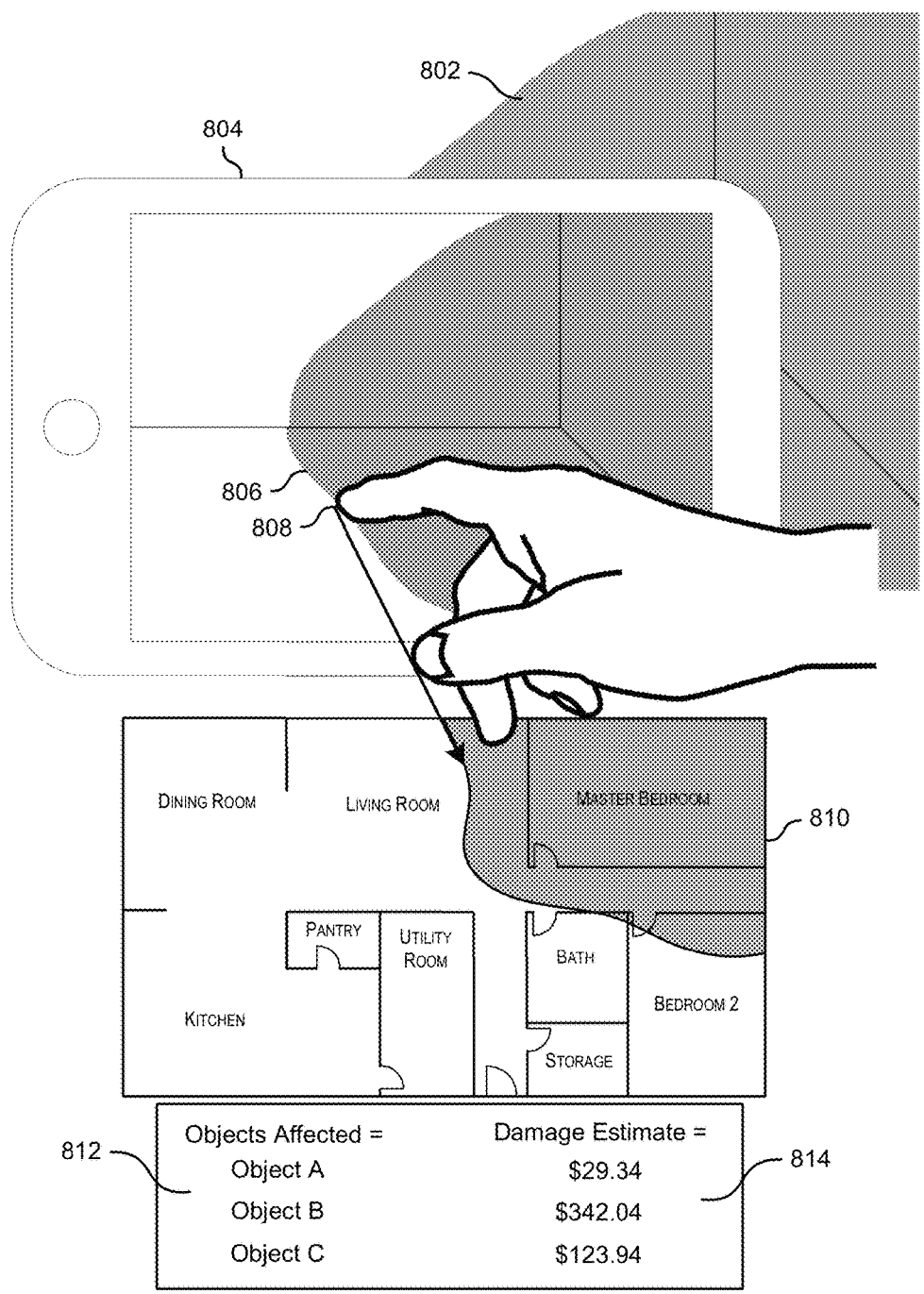
FIG. 8 depicts an illustrative example of a user interaction that may occur using a record of objects and their respective positions which has been generated for a user in accordance with at least some embodiments.

FIG. 8 depicts an illustrative example of a user interaction that may occur using a record of objects and their respective positions which has been generated for a user in accordance with at least some embodiments. In FIG. 8, a user may generate a catalog of objects in accordance with the techniques described with respect to FIG. 5 above. For example, a first user may walk through a house while capturing images of various objects in the house using a user device. As described above, the system may detect and identify the various objects. Each object, and its position, may be added to a catalog of objects associated with a user (e.g., an owner of the house) as it is identified. This catalog of objects and their associated positions may be stored in relation to the user (e.g., in an account associated with the user). Each of the objects may then be mapped to corresponding objects in an object model database in order to associate those objects with various attributes stored in the object model database. For example, the system may identify a current value of an object based on its retail value stored in the object model database. As described elsewhere, this mapping may be performed using one or more machine learning techniques.

In some embodiments, the techniques described above may be performed by the user with which the objects are to be associated. In some embodiments, the techniques described above may be performed by a third party entity, such as an insurance adjuster or an interior designer. This allows a user to quickly assess attributes of a room based on the objects in that room. For example, an insurance adjuster may quickly determine not only what objects are in a room, but the total value of the room itself based on those objects. In another example, an interior designer may quickly determine a style or theme associated with a particular room, which may enable the interior designer to make recommendations that align with that style.

Once a catalog of objects and their respective locations has been generated for a particular user, the system may enable a user (either the same user or a different user) to quickly assess the impact of an event. For example, some area 802 of a home may be negatively impacted by an event such as a fire, a burglary, a flood, an earthquake, or any other impactful event. In this example, a user may use a user device 804 to capture image information of the area 802 which is impacted by the event. In some embodiments, the edges of area 802 may be determined automatically based on discontinuities or variances 806 in color/texture at the edges of the area 802. In some embodiments, the user may tap or trace 808 the edges of the area 802 on a screen of the user device 804 in order to indicate the area impacted by the event.

In some embodiments, an area impacted by an event may be compared to a layout 810 of the user's space. In some cases, a damage assessment for an event may be calculated at least in part as a function of the amount of the user's space impacted by the event. In some cases, the system may identify, based on stored object position data, a set of objects 812 impacted by the event (e.g., objects located within the area of impact). The system may then estimate, based on attributes associated with each of the set of objects 812, an impact 814 of the event on the user. Additionally, in some cases, a catalog of objects associated with the user may be used to help recreate or investigate the event. For example, a user (such as a detective or insurance adjuster) may be provided with the ability to see various objects in the way that they were positioned prior to the event using augmented reality technology as described herein. This may enable the user to recreate or investigate an area (e.g., investigate the cause of a fire).

Figure 9:
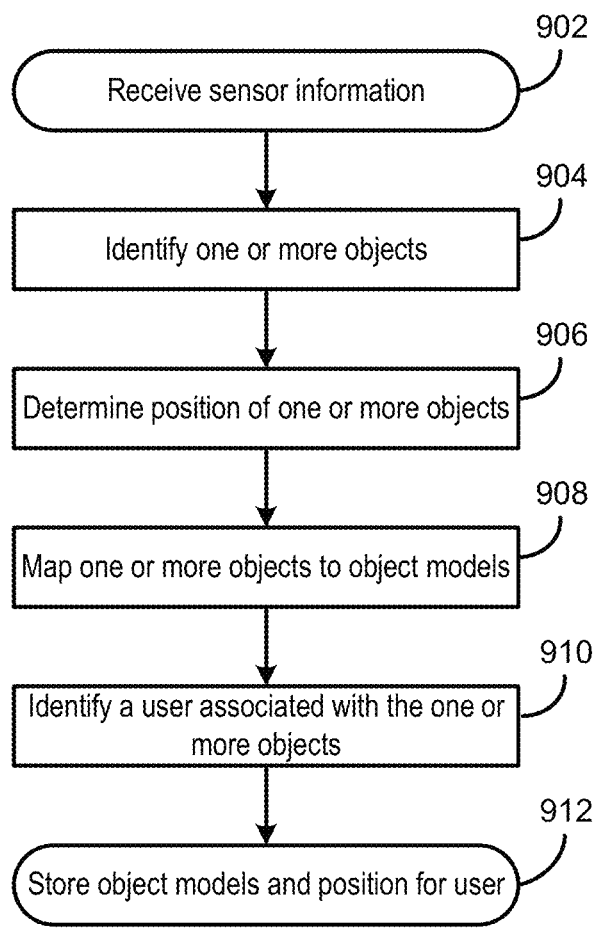
FIG. 9 depicts a flow diagram illustrating a process for generating an object catalog for a user that includes position data in accordance with at least some embodiments.

FIG. 9 depicts a flow diagram illustrating a process for generating an object catalog for a user that includes position data in accordance with at least some embodiments. Process 900 may be performed using some combination of a user device 202 and/or a mobile application server 204, each of which is depicted with respect to FIG. 2.

Process 900 may begin at 902 when sensor output is received. In accordance with at least some embodiments, the sensor output may include at least image information as well as depth information. The sensor output may be obtained using multiple sensor devices installed on a single user device. In some embodiments, the sensor output may be received as streaming data (e.g., data that is constantly updated). In some embodiments, the sensor output may be received as a single still image.

At 904, the process may involve identifying one or more objects within the sensor view. As described elsewhere, there are a number of techniques that would be known to one skilled in the art for identifying objects within sensor view. In some embodiments, identification of the object may involve identification of a broad category of the object. In some embodiments, identification of the object may involve identification of a specific model or version of the object within a broad category of objects. In some embodiments, a user device may detect the presence of an object by identifying edges or discontinuities within the sensor output. In at least some of these embodiments, the user device may transmit a portion of the sensor output within the identified edges to a remote application server for further processing.

At 906, the process may involve determining a position of the one or more objects within the sensor view. The object's position within an image may be mapped to a corresponding position within depth information to identify a distance between the user device and the identified object. In some embodiments, a location and orientation of a user device from which the sensor output was obtained may be provided. For example, the sensor output may include location information (e.g., GPS coordinates) as well as direction information (e.g., a compass reading). When determining a position of the object, the user device's position may be combined with the determined distance between the user device and the object in order to identify a location of the object. Additionally, the orientation, or facing, of the object may be identified in order to determine a position of the object.

At 908, the process may involve mapping the identified objects to corresponding object models. As described elsewhere, the identified objects may be correlated to corresponding object models using machine learning techniques.

In some embodiments, the process may involve identifying a type or version of an object and then retrieving an object model associated with the type or version. For example, an object model database may be queried to identify an object model stored in relation to the identified object.

At 910, the process may involve identifying a user associated with the one or more objects. In some embodiments, the user may be identified by virtue of being associated with the user device. For example, an account maintained by the system may store an indication that a phone number of the user device is associated with the user. In some embodiments, a user may be identified by virtue of being logged into an account maintained by the system. In some embodiments, the user may provide an identifier that may be used to identify the user.

At 912, the process may involve storing the object models and position information with respect to the identified user. In some embodiments, an indication of the object models may be stored in a catalog of objects associated with the user. Each indication of an object model may be stored in association with the determined position of the object. For example, the system may store an indication that the user owns a particular object, one or more attributes of the object, a location of the object, and an orientation of the object.

Figure 10:
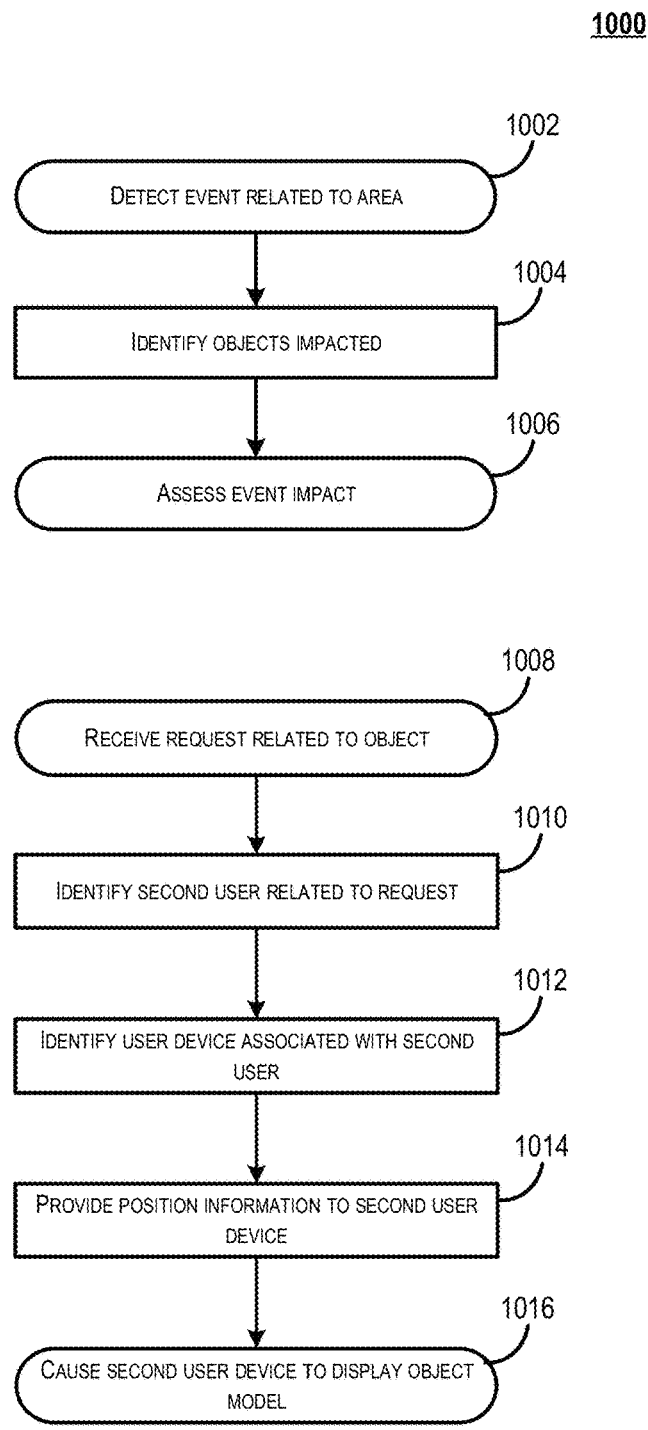
FIG. 10 depicts a flow diagram illustrating sample processes for using object record data that includes position data in accordance with at least some embodiments.

FIG. 10 depicts a flow diagram illustrating sample processes for using object record data that includes position data in accordance with at least some embodiments. Process 1000 may be performed using a user device 202 or using some combination of a user device 202 and/or a remote application server 204, each of which is depicted with respect to FIG. 2. Process 1000 depicts two subprocesses that may each be performed with respect to a catalog of objects and position data generated with respect to a user (e.g., via the process 900 described with respect to FIG. 9 above).

The first subprocess of process 1000 may begin at 1002 when an event is detected with respect to an area. In some embodiments, the event may be one that impacts an area in which one or more objects are located. In these embodiments, the event may be one that results in the destruction of a number of objects within the area of impact. For example, the event may be a flood, fire, earthquake, or other impactful event. In some embodiments, the bounds of an area impacted by an event may be determined. In some cases, the bounds may be identified by a user via a user device. In some embodiments, the bounds of the area of impact may be determined automatically based on discontinuities in brightness, color, or texture.

At 1004, the process may involve identifying objects impacted by the event. In some embodiments, the system may determine the bounds of the area impacted by the event. The system may then query a database of objects, and their respective locations, which are maintained with respect to various users. The process may then involve determining which objects are within the impacted area based on the position of each object with respect to the bounds of the impacted area.

At 1006, the process may involve assessing an impact of the event. In some embodiments, this may involve determining a value of the impacted area. For example, the system may determine a value for each of the objects determined to be impacted by the event. In this example, the system may calculate a sum total of each of the values determined for each of the objects.

The second subprocess of process 1000 may begin at 1008 when a request is received related to an object. In some embodiments, the request may be a request to install or assemble the object. In some embodiments, the request may be a request to move the object from a first position to a second position. In some embodiments, the request may be submitted to the system via a mobile application installed upon a user device.

At 1010, the process may involve identifying a second user associated with the request. In some embodiments, the process may involve identifying the second user based on the received request. For example, a user from which the request was received may indicate the second user. In this example, the user from which the request was received may request a particular user to fulfill the request. For example, a user may request a particular mover, assembler, or installer to handle the request with respect to the object. In some embodiments, the request may pertain to a particular store or retailer. The second user may be identified as an employee of that store. In some embodiments, the user may be identified as the next available user able to handle a particular type of request.

At 1012, the process may involve identifying a user device associated with the second user. In some embodiments, the user device may be identified based upon a phone number provided by the requesting user. In some embodiments, the user device may be identified based on an indication of the user device stored in a database in association with the identified user (e.g., a phone number).

At 1014, the process may involve providing position information to the identified second user device. For example, the system may generate a route to the object based on the received request. In some embodiments, the system may identify a layout or other suitable indication of an area in which one or more objects are positioned. The system may generate a route through one or more rooms in order to guide the user to a location associated with the received request.

At 1016, the process may involve causing the second user device to display the object model. For example, upon reaching the location of the object indicated in the received request, the second user may use the second user device to capture image information of an environment surrounding the location. The second user device may be configured to depict, using augmented reality, an image of the object model such that it appears to be positioned in the indicated position. This may enable the second user to ensure that the object is properly installed or assembled in the selected position.

Figure 11:
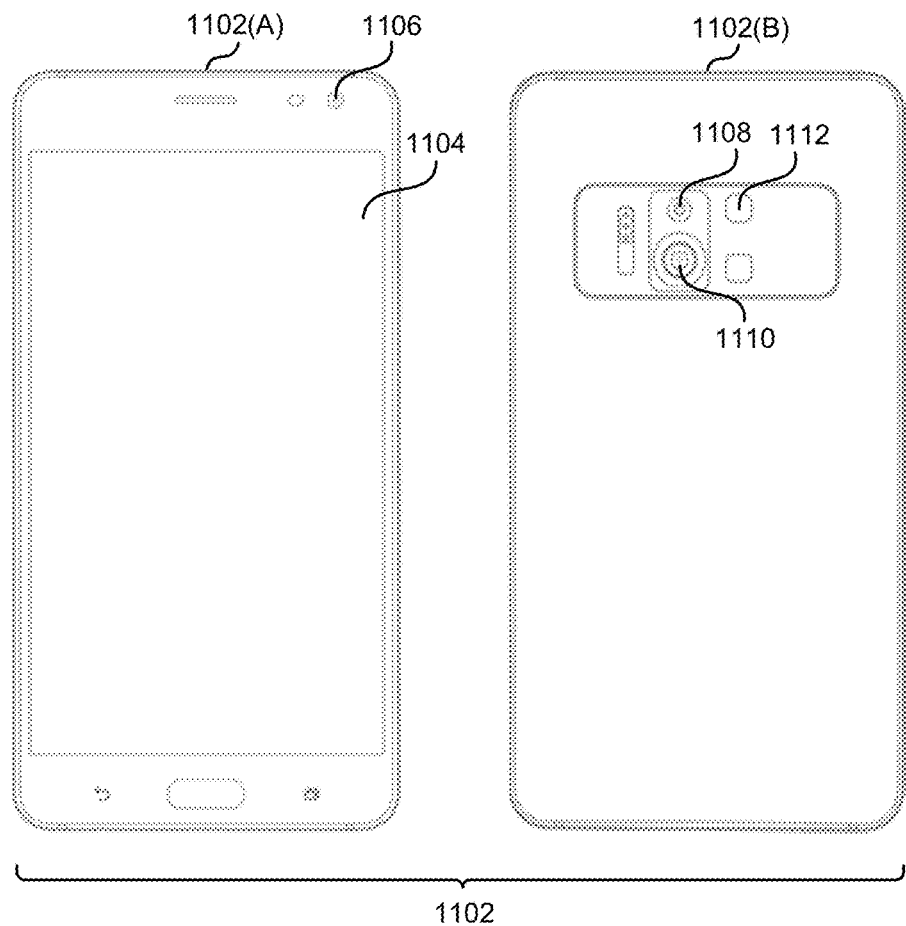
FIG. 11 depicts an illustrative example of a user device capable of performing at least a portion of the functionality described herein.

FIG. 11 depicts an illustrative example of a user device capable of performing at least a portion of the functionality described herein. In FIG. 11, a front 1102(A) and back 1102(B) are depicted for a user device 1102. The depicted user device 1102, as may be used in some particular embodiments of the system described herein, may be a ZENFONE AR (ZS571KL) smartphone device manufactured by ASUS corporation or a PHAB 2 PRO smartphone device manufactured by LENOVO corporation.

As depicted in FIG. 11, the user device 1102 may include a display screen 1104 capable of displaying image information to a user of the user device 1102. Additionally, the user device 1102 may include a number of camera devices. For example, the user device 1102 may include a front-facing camera 1106. Additionally, the user device 1102 may include multiple rear-facing cameras, each of which serves different purposes. For example, the rear-facing cameras of the user device 1102 may include both a high-resolution camera device 1108 for capturing detailed images, a motion tracking camera 1110 for tracking the user device's location as it moves through space while capturing image information, and a depth sensor camera 1112 for capturing depth information associated with captured image information.

Additionally, the user device 1102 may include software that, in conjunction with a number of processors of the user device 1102, provides at least a portion of the functionality described herein. For example, the software application TANGO, which is developed by GOOGLE corporation, enables motion tracking, area learning, and depth perception functionality on the depicted user device 1102. A mobile application, as described herein, which is installed upon the user device 1102 may use one or more of these functionalities by performing an API or method call in accordance with TANGO specifications. Accordingly, it should be noted that the system described herein is fully enabled by the combination of hardware and software depicted.

Embodiments of the invention provide for a number of technical advantages over conventional systems. For example, the system described herein is able to automatically generate a record of objects and their positions for a user with minimal effort on the part of the user. In some cases, this allows for a more accurate identification of an object. This also provides for a significantly more accurate assessment of an area's value. This enables various parties, such as insurance adjusters, to quickly and accurately establish damages in the event of some catastrophe and determine the value of a claim.

Additionally, although some conventional augmented reality systems may enable users to visualize an appearance of an area with a particular object configuration, those conventional augmented reality systems do not enable a user to share that vision with others. Hence, the system described herein includes improved functionality over conventional systems in that users are able to provide object position information to other users, who can then see exactly what the users have visualized. This enables a first user to provide explicit assembly/installation instructions to another user without needing to meet up or to provide lengthy details. Instead, the user need only select a position for an object on his user device and transmit the position to a second user device. The second user device can then be used to show the object in its selected position.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of generating a catalog of positioned objects, comprising:
    receiving sensor output obtained using one or more input sensors of a user device;
    identifying, within the sensor output, one or more objects;
    determining, based on the sensor output and based on a location of the user device, a position of the one or more objects;
    mapping the one or more objects to one or more corresponding object models within an object model database;
    identifying that the one or more objects are to be associated with the determined position;
    storing an indication of the one or more object models and the determined position of the one or more objects;
    generating an extrapolated image of an area where the one or more objects are located that depicts the area without the one or more objects; and
    causing the extrapolated image to be displayed on a display screen such that the one or more objects appear to be absent from the sensor output.

2. The method of claim 1, wherein the sensor output includes at least image information and depth information associated with the one or more objects.

3. The method of claim 1, further comprising:
    receiving, from a second user device, a second location associated with the second user device;
    determining, based on the second location and the determined position of the one or more objects, that the second user device is within a vicinity of the one or more objects; and
    providing, to the second user device, the one or more object models.

4. The method of claim 3, further comprising causing the second user device to augment an image displayed on a display screen of the second user device such that the one or more object model appears to be positioned in the determined position of the one or more objects.

5. The method of claim 1, further comprising:
    determining, based on the identification of the one or more objects, whether any one or more other objects not present in the image might be of interest to a person using the method; and
    recommending at least one of the one or more other objects to the person.

6. The method of claim 1, further comprising:
identifying that the one or more objects are to be associated with a user based on the user being associated with the user device; and
storing an indication of the user with respect to the one or more object models and the determined position of the one or more objects.

7. The method of claim 1, further comprising:
detecting an event which impacts a geographic area;
determining that the one or more objects are located within the geographic area based on the determined position of the one or more objects; and
assessing an impact of the event based on one or more attributes of the one or more objects.

8. A system comprising:
one or more camera devices;
a processor; and
a memory including instructions that, when executed with the processor, cause the system to, at least:
receive sensor data from the one or more camera devices;
identify, within the sensor data, at least one object, the object being distinct from an area in which the object is located;
determine, based on the sensor data and a location of the one or more camera devices, a position of the at least one object;
match the at least one object with at least one object model stored in an object model database;
store an indication of the at least one object model and the determined position of the at least one object;
generate an extrapolated image of an area where the at least one object is located that depicts the area without the at least one object; and
cause the extrapolated image to be displayed on a display screen such that the at least one object appears to be absent from the sensor output.

9. The system of claim 8, wherein the determined position includes a location and orientation of the at least one object.

10. The system of claim 8, wherein the location of the one or more camera devices comprises GPS coordinates of a user device on which the one or more camera devices was installed.

11. The system of claim 8, wherein one of the one or more camera devices comprises a depth sensor.

12. The system of claim 8, wherein the instructions, when executed with the processor, cause the system to match the at least one object to the at least one object model using one or more machine learning techniques.

13. The system of claim 8, wherein the instructions, when executed with the processor, cause the system to identify the at least one object using one or more object recognition techniques.

14. The system of claim 8, wherein the memory further includes instructions that, when executed with the processor, cause the system to, at least:
determine, based on the identity of the one or more objects, whether any one or more other objects might be of interest to a person using the method; and
recommend at least one of the one or more other objects to the person.

15. An apparatus comprising:
a camera device configured to capture image information;
a depth sensor device configured to capture depth information;
a display screen; and
a mobile application stored in a computer-readable medium that, when executed, causes the apparatus to, at least:
identify, within image information captured by the camera device, one or more objects;
determine a position of the one or more objects from depth information captured by the depth sensor;
provide, to a server in communication with the apparatus, an indication of the one or more objects and the position of the one or more objects to cause the server to generate an extrapolated image of an area where the one or more objects are located that depicts the area without the one or more objects; and
display, on the display screen, the extrapolated image such that the one or more objects appear to be absent from the sensor output.

16. The apparatus of claim 15, wherein the mobile application, when executed, further causes the apparatus to receive, from the server, one or more object models associated with the one or more objects.

17. The apparatus of claim 16, wherein the mobile application, when executed, further causes the one or more object models to be displayed upon the display screen in the area where the one or more objects are located.

18. The apparatus of claim 17, wherein the mobile application, when executed, causes the at least one object to be removed from the image information displayed on the display and replaced by the one or more object models.

19. The apparatus of claim 16, wherein the mobile application, when executed, causes the one or more object models to be received upon determining that the apparatus is within a vicinity of the determined position.

20. The apparatus of claim 15, wherein the mobile application, when executed, causes the apparatus to identify a category associated with the one or more objects.

21. The apparatus of claim 15, wherein the mobile application, when executed, causes the apparatus to identify a type or model of the one or more objects.

22. The apparatus of claim 15, wherein the mobile application, when executed, further causes the apparatus to, at least:
determine, based on the identity of the one or more objects, whether any one or more other objects might be of interest to a person using the apparatus; and
recommend at least one of the one or more other objects to the person.

23. A method of generating a catalog of positioned objects, comprising:
receiving sensor output obtained using one or more input sensors of a user device;
identifying, within the sensor output, one or more objects;
determining, based on the sensor output and based on a location of the user device, a position of the one or more objects;
mapping the one or more objects to one or more corresponding object models within an object model database;
identifying that the one or more objects are to be associated with the determined position;
storing an indication of the one or more object models and the determined position of the one or more objects;
receiving, from a second user device, a second location associated with the second user device;
determining, based on the second location and the determined position of the one or more objects, that the second user device is within a vicinity of the one or more objects; and providing, to the second user device, the one or more object models.

24. The method of claim 23, further comprising:
causing the second user device to augment an image displayed on a display screen of the second user device such that the one or more object model appears to be positioned in the determined position of the one or more objects.

25. A system comprising:
one or more camera devices;
a processor; and
a memory including instructions that, when executed with the processor, cause the system to, at least:
receive sensor data from the one or more camera devices;
identify, within the sensor data, at least one object, the object being distinct from an area in which the object is located;
determine, based on the sensor data and a location of the one or more camera devices, a position of the at least one object;
match the at least one object with at least one object model stored in an object model database;
store an indication of the at least one object model and the determined position of the at least one object
receive, from a second system, a location associated with the second system;
determine, based on the location and the determined position of the at least one object, that the second system is within a vicinity of the at least one object; and
provide, to the second system, the at least one object model.

26. The system of claim 25, further comprising a display screen, wherein the memory further includes instructions that, when executed with the processor, cause the display screen to display the received at least one second object model so that it appears to be in a location of the at least one second object.

27. An apparatus comprising:
a camera device configured to capture image information;
a depth sensor device configured to capture depth information;
a mobile application stored in a computer-readable medium that, when executed, causes the apparatus to, at least:
identify, within image information captured by the camera device, one or more objects;
determine a position of the one or more objects from depth information captured by the depth sensor;
provide, to a server in communication with the apparatus, an indication of the one or more objects and the position of the one or more objects to cause the server to store the indication of the one or more objects in relation to the position of the one or more objects; and
receive, from the server in response to the server determining that a location of the apparatus is within a vicinity of at least one second object, at least one second object model associated with the at least one second object.

28. The apparatus of claim 27, wherein the mobile application further causes the apparatus to display, on a display screen of the apparatus, the received at least one second object model so that it appears to be in a location of the at least one second object.

29. The method of claim 1, further comprising:
providing the one or more object models to the user device; and
causing the one or more object models to be depicted within the extrapolated image.

* * * * *